United States Patent [19]

Kohl et al.

[11] Patent Number: 4,507,457

[45] Date of Patent: Mar. 26, 1985

[54] PRODUCTION OF MAGNETIC RECORDING MEDIA

[75] Inventors: Albert Kohl, Weisenheim; Norbert Schneider, Altrip; Gregor Ley, Wattenheim; Werner Balz, Limburgerhof; Milena Melzer, Ludwigshafen; Helmut Jakusch, Frankenthal, all of Fed. Rep. of Germany

[73] Assignee: BASF Aktiengesellschaft, Fed. Rep. of Germany

[21] Appl. No.: 525,621

[22] Filed: Aug. 23, 1983

[30] Foreign Application Priority Data

Aug. 28, 1982 [DE] Fed. Rep. of Germany ....... 3232117

[51] Int. Cl.$^3$ .............................................. H01F 10/02
[52] U.S. Cl. .................................... 427/48; 427/128; 427/130
[58] Field of Search ................ 427/48, 128, 132, 131; 428/329, 611; 430/631, 137, 106.6

[56] References Cited

U.S. PATENT DOCUMENTS

| | | | |
|---|---|---|---|
| 4,272,615 | 6/1981 | Yoneyama et al. | 430/631 |
| 4,328,282 | 5/1982 | Lehner et al. | 427/128 |
| 4,430,362 | 2/1984 | Melzer et al. | 427/48 |

*Primary Examiner*—John E. Kittle
*Assistant Examiner*—John L. Goodrow
*Attorney, Agent, or Firm*—Keil & Weinkauf

[57] ABSTRACT

Magnetic recording media are produced by dispersing timely divided anisotropic magnetic material in a polymeric binder to a non-magnetizable base.

4 Claims, No Drawings

PRODUCTION OF MAGNETIC RECORDING MEDIA

The present invention relates to a process for the production of magnetic recording media which are particularly useful as audio, video or computer tapes, by dispersing finely divided anisotropic magnetic material and conventional additives in a solution of a polymeric binder in an organic solvent or an aqueous dispersion of a polymeric binder, applying the dispersion, in the form of a layer, to a non-magnetizable base, orienting the anisotropic magnetic material in a magnetic field and then drying the applied layer. Magnetic layers in recording media which are used in modern audio and video recording and playback equipment have to satisfy a number of requirements. In addition to having outstanding mechanical properties such as high flexibility, elasticity, tensile strength and abrasion resistance, the magnetic layers must also exhibit excellent electro-acoustic properties, particularly where cassette audio tapes, open-reel audio tapes and video tapes are concerned. In order to achieve this object, it is necessary not only to use particularly suitable magnetic pigments, such as chromium dioxide, cobalt-doped iron oxides and ferromagnetic metal particles, but also to match all the materials present in the magnetic layer so that this layer has particularly high remanence in the recording direction and a very smooth surface. Although such magnetic layers must contain a large amount of magnetizable material in the magnetic layer, it must also be possible to orient the magnetizable acicular particles in the said layer so that they lie to a very substantial extent parallel to the intended recording direction. For a given magnetic material, the improvement in the abovementioned properties, such as surface roughness, remanence and orientation ratio, depends to a high degree on the binders and additives used in the production of the magnetic layer. Of the additives, it is primarily the dispersants which, by improving the dispersibility, influence both the packing density and the orientability of the magnetic particles.

The reduction in the surface roughness of the magnetic layer is particularly important in the case of high-quality magnetic recording media intended to record a wide bandwidth including high frequencies, since a particularly close tape/head contact is required in order to achieve resolution of very short wavelengths. Any unevenness alters the distance between the tape surface and the head and hence leads to signal losses at high frequencies. It is prior art practice to smoothen the surface of the magnetic layer after the coating operation by passing the coated base material between heated rollers under pressure. However, the smoothness achievable by this treatment depends substantially on the original smoothness of the dried layer; layers which are originally very rough cannot be made as smooth by calendering as those which exhibit slight roughness before calendering.

To achieve reasonable original smoothness, it has been proposed in several publications that dispersants be added to the fluid coating mix, at the beginning of the dispersing operation, in order to facilitate dispersion of the magnetic pigment in the binder. The substances employed for this purpose are primarily surfactants whose molecular structure contains a hydrophilic and a hydrophobic radical and whose active structure possesses anionic, cationic, amphoteric or non-ionic character. The amount of these dispersants has to be very carefully matched to the rest of the formulation, since, under unfavorable external conditions, an excess of these substances can very easily exude from the surface of the magnetic coating and form deposits thereon and on the parts of the recording/playback apparatus with which the tape comes into contact; this is extremely undesirable. Moreover, in the case of most dispersants, it is found that when they reach a certain concentration, which corresponds to a saturation of the active centers of the magnetic pigment surface, the dispersibility and hence the packing density and orientability of the magnetic materials cannot be further improved.

It is an object of the present invention to provide a process for the production of magnetic recording media in which the magnetic layer possesses an especially smooth surface and, in particular, the particles in the magnetic layer have a high packing density and at the same time exhibit improved orientation in the intended recording direction, resulting in increased remanence in this direction. Because of these improvements, the resulting recording media possess more advantageous recording properties, particularly at high frequencies.

We have found that this object is achieved, and that magnetic recording media having the required properties can be obtained, by dispersing finely divided anisotropic magnetic material and conventional additives in a solution of a polymeric binder in an organic solvent or an aqueous dispersion of a polymeric binder applying the dispersion, in the form of a layer, to a non-magnetizable base, orienting the anisotropic magnetic material by means of a magnetic field and then drying the applied layer, if the dispersant added is a copolymer which contains, as characteristics monomers, (a) from 80 to 2% by weight of an ethylenically unsaturated $C_3$-$C_5$-carboxylic acid, acrylamidodimethylpropanesulfonic acid, vinylsulfonic acid, vinylphosphoric acid or a mixture of the said monomers, and (b) from 20 to 98% by weight of a polymerizable ethylenically unsaturated compound of the formula $$R^1-O-(CH_2-CH_2-O)_n-(CH_2-\underset{CH_3}{\overset{|}{C}H}-O)_m-CO-\underset{R^2}{\overset{|}{C}}=CH_2 \qquad (I)$$

where
$R^1$ is alkyl of 1 to 20 carbon atoms or unsubstituted or $C_1$-$C_{12}$-alkyl-substituted phenyl,
$R^2$ is H or $-CH_3$, n is 2 to 100 and m is 0 to 50.

In an advantageous embodiment of the novel process, the said copolymers can additionally contain, as copolymerized units, (c) not more than 50% by weight of one or more other ethylenically unsaturated monomers which are copolymerizable with (a) and (b).

These copolymers and their preparation have been disclosed (German Laid-Open Application DOS No. 2,758,122).

These copolymers, which are employed as dispersants in the novel process, are added to the mixture to be dispersed in an amount of from 0.5 to 5, preferably from 1 to 3%, by weight, based on the amount of magnetic material. If the magnetic layer contains other conventional additives which, in addition to having other effects, such as bringing about an improvement in the frictional properties or flow, promote dispersion, the copolymers still exhibit their advantageous action.

However, the amount used should never be less than 0.5% by weight.

The preparation of the dispersion of the magnetic material in the dissolved or dispersed polymeric binder is effected in a conventional manner.

Preferably used magnetic materials are finely divided acicular gamma-iron(III) oxide and acicular chromium dioxide, each having a mean particle size of from 0.1 to 2 μm, in particular from 0.1 to 0.9 μm. Other suitable materials are gamma-iron(III) oxide doped with heavy metals, in particular cobalt, as well as finely divided alloys of iron, cobalt and/or nickel.

Suitable binders for the dispersion of the finely divided magnetic material are those conventionally used for the production of magnetic layers, eg. a nylon copolymer which is soluble in conventional solvents, a polyvinylformal, a polyurethane elastomer, mixtures of polyisocyanates and relatively high molecular weight polyhydroxy compounds or vinyl chloride polymers containing more than 60% of vinyl chloride units, e.g. a vinyl chloride copolymer containing one or more comonomers, such as a vinyl ester of a monocarboxylic acid of 2 to 9 carbon atoms, or an ester of an aliphatic alcohol of 1 to 9 carbon atoms with an ethylenically unsaturated carboxylic acid of 3 to 5 carbon atoms, such as the esters of acrylic acid, methacrylic acid or maleic acid, or a copolymer of vinyl chloride with one or more of these carboxylic acids themselves as comonomers, or hydroxyl-containing vinyl chloride copolymers which can be prepared by partial hydrolysis of vinyl chloride/vinyl ester copolymers or by direct copolymerization of vinyl chloride with hydroxyl-containing monomers, such as allyl alcohol, 4-hydroxybutyl acrylate or methacrylate or 2-hydroxyethyl acrylate or methacrylate. Other suitable binders include mixtures of one or more polyurethane elastomers with polyvinylformals, phenoxy resins and vinyl chloride copolymers of the above composition. Preferred binders are polyvinylformals and polyurethane elastomer-containing mixtures of the said type, especially mixtures with polyvinylformals. Preferably used polyurethane elastomer binders are commercial elastomeric polyester-urethanes obtained from adipic acid, butane-1,4-diol and 4,4'-diisocyanatodiphenylmethane.

Other advantageous binders include OH-containing polyurea-urethane binders which are crosslinked with a polyisocyanate, the said polyurea-urethane being obtained by reacting a polydiol, a diol and a primary or secondary amino alcohol, and if appropriate a triol, with a diisocyanate.

Magnetic dispersions which are particularly useful for the production of rigid magnetic disks preferably contain, as binders, for example epoxy resins, phenoxy resins, aminoplast precondensates, polyester resins, polyurethanes or polyurethane-formers or mixtures of such binders with one another or with other binders, such as polycarbonates or vinyl polymers, e.g. vinyl chloride copolymers, vinylidene chloride copolymers or thermosetting acrylate or methacrylate copolymers.

Aqueous dispersions of organic polymers may also be used as binders. Polyurethane ionomers as described in, for example, German Laid-Open Applications DOS No. 2,920,334 and DOS No. 3,005,009 are particularly useful for this purpose.

The magnetic dispersion may contain other additives used in the production of magnetic coatings, for example small amounts of monocarboxylic acids, or mixtures or esters thereof, as well as fillers, such as carbon black, graphite, quartz flour and/or non-magnetizable powder based on silicates, and flows improvers, such as small amounts of silicone oil. Advantageously, the total amount of these additives should not exceed 12, preferably 8, % by weight, based on the weight of the dry magnetic layer.

The magnetic layer can be produced in a conventional manner. The magnetic material is, for example, dispersed together with the binder and sufficient solvent, in a conventional dispersing apparatus, e.g. a tubular ball mill or a stirred ball mill, with the addition of the copolymer and with or without the addition of further additives. To obtain an advantageous binder/pigment ratio, the binder can be added to the mixture either as a solid or in the form of a 20–60% strength solution or a 30–60% dispersion. It has proved advantageous to continue the dispersing process until the magnetic material is extremely finely dispersed. This may take from 1 to 3 days. By repeatedly filtering the resulting dispersion, a completely homogeneous magnetic dispersion is obtained.

The magnetic dispersion is then applied to the non-magnetizable base by means of a conventional coating apparatus, e.g. a knife coater. Suitable non-magnetizable bases are the conventional ones, in particular films of linear polyesters, e.g. polyethylene terephthalate, which are in general from 4 to 200, in particular from 6 to 36, μm thick. While the coating mix on the base is still fluid, the anisotropic magnetic particles are oriented in the intended recording direction by the action of a magnetic field; the coating is then dried, advantageously at from 50 to 90° C. for from 2 to 5 minutes. The magnetic layer can then be subjected to a conventional surface treatment, e.g. calendering in which the coated base material is passed between polished rollers, with the application of pressure and optional heating at from 50° to 100° C., preferably from 60° to 80° C. The thickness of the magnetic layer is in general from 3 to 20, preferably from 6 to 15, μm.

The magnetic recording media produced in accordance with the invention are distinguished by high remanence and a high orientation ratio as well as by low surface roughness. This results in an increase in the output level and in the maximum output levels at both long and short wavelengths.

EXAMPLE 1

140 parts of a compound of the formula

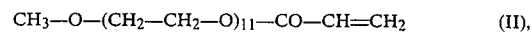

$$CH_3-O-(CH_2-CH_2-O)_{11}-CO-CH=CH_2 \qquad (II),$$

280 parts of methacrylic acid, 630 parts of isopropanol and 630 parts of water were initially introduced into a polymerization vessel equipped with a stirrer, a reflux condenser, a thermometer and nitrogen inlet and outlet lines and immersed in a water bath. The mixture was stirred and heated to about 50° C., a clear solution being obtained. Thereafter 14 parts of azobisisobutyronitrile were added, and the mixture was heated at the boil for 3 hours, after which it was cooled to give a clear yellowish polymer solution having a solids content of 25%. The water-soluble copolymer had a K value of 40.4, measured in accordance with H. Fikentscher, Cellulosechemie 13, (1932), 58–65 and 71–74, on a 3% strength dimethylformamide solution at 20° C.; K=k.10³.

EXAMPLE 2

A polymerization pressure vessel as described in Example 1 and additionally having two pressure-resistant feed vessels provided with stirrers was used. The following mixtures were introduced into the polymerization vessel:

Feed I 80 parts of tetrahydrofuran,
19.6 parts of the monomer of the formula (III) and
9.8 parts of methacrylic acid

Feed II 0.98 part of azobisisobutyronitrile and
8.2 parts of tetrahydrofuran.

After flushing with $N_2$, 20% by weight of feed I was initially introduced into the polymerization vessel and heated to 50° C. 20% by weight of feed II was added at this temperature, and the mixture was heated further to 80° C. The mixture was kept at this temperature for 15 minutes, after which the remainder of feeds I and II were fed in continuously, alongside one another, in the course of 1 hour. When the addition was complete, the mixture was kept at 80° C. for a further 1.5 hours, after which it was cooled and the pressure was let down. The resulting yellowish polymer solution had a solids content of 26.7% and the polymer had a K value of 16.8.

EXAMPLE 3

1,000 g of a magnetic iron oxide having a coercive force of 26 kA/m and a specific surface area of 20 m²/g, 16 g of the dispersant described in Example 2, 200 g of a low molecular weight polyurethane prepolymer crosslinked with a polyisocyanate, as the binder, 1 g of silicone oil, 1 g of butyl stearate, 2 g of isostearic acid, 2 g of hydroquinone and 2,000 g of a solvent mixture of equal parts of tetrahydrofuran and dioxane were introduced into a steel ball mill having a capacity of 6,000 parts by volume and containing 8,000 g of balls, and the mixture was dispersed for 72 hours.

The resulting magnetic dispersion was filtered and then applied to a 12 μm thick polyethylene terephthalate film by means of a knife coater.

The coated film was passed through a uniform magnetic field to orient the magnetic particles in the layer and was then dried at 70°–90° C. The layer was then calendered at 70° C. The thickness of the dry layer was 4.7 μm. The coated film was slit into 3.81 mm wide tapes.

The surface roughness of both the calendered and non-calendered layers was measured as the average peak-to-valley height ($R_z$), in accordance with DIN 4,768, Sheet 1. The reflectance of the non-calendered layer was measured in accordance with DIN 67,530. The electroacoustic properties were measured in accordance with DIN 45,401, 45,403 and 45,512 (Sheet 12), against reference tape IEC 1. The results of the measurements are shown in Table 1.

COMPARATIVE EXPERIMENT 1

The procedure described in Example 3 was followed, except that the dispersant used was a commercial product based on a salt of long-chain polyamine-amides and a high molecular weight acidic ester. The results are shown in Table 1.

EXAMPLE 4

The low molecular weight polyurethane prepolymer employed in Example 3 was replaced by a binder mixture consisting of a copolymer comprising 80% of vinyl chloride, 10% of dimethyl meleate and 10% of diethyl maleate, with a polyurethane elastomer. Dispersing was carried out in two stages. In the first stage, 6.7 parts of the binder mixture together with 6.4 parts of the dispersant described in Example 2, silicone oil, butyl stearate, isostearic acid, hydroquinone and 120 parts of solvent were dispersed per 100 parts of iron oxide, dispersing being carried out for 60 hours. A further 19 parts of the binder mixture and 130 parts of solvent were then worked in for 5 hours, 3.3 parts of a polyisocyanate were stirred in and the mixture was immediately used for coating. Magnetic tapes were produced with the magnetic dispersion as described in Example 3. The results are shown in Table 1.

COMPARATIVE EXPERIMENT 2

Example 4 was repeated, except that the dispersant used was that of Comparative Experiment 1. Since, however, the average peak-to-valley height ($R_z$) of the magnetic layer was above 3.0 μm even after the mixture had been dispersed for 80 hours, the electroacoustic properties were completely unsatisfactory.

TABLE 1

|  | Example 3 | Comparative Experiment 1 | Example 4 |
|---|---|---|---|
| Average peak-to-valley height $R_z$, non-calendered (μm) | 0.46 | 1.23 | 0.70 |
| Average peak-to-valley height $R_z$, calendered (μm) | 0.26 | 0.43 | 0.22 |
| Reflectance, non-calendered | 50 | 26 | 25 |
| Sensitivity at long wavelengths $S_L$ (dB) 315 Hz | +1.5 | +1.0 | +0.1 |
| Sensitivity at short wavelengths $S_S$ (dB) 10 kHz | +1.3 | −2.3 | +1.1 |
| Maximum output level at long wavelengths $O_L$ (dB) 315 Hz | +1.3 | +1.0 | +0.6 |
| Maximum output level at short wavelengths $O_S$ (dB) 10 kHz | 0 | −2.8 | +0.4 |
| Thickness of magnetic layer | 4.7 μm | 4.6 | 4.9 |

EXAMPLE 5

1,200 g of a magnetic iron oxide having a coercive force of 26 kA/m and a specific surface area of 20 m²/g, 96 g of the dispersant described in Example 1, 20 g of 10% strength ammonia solution, 12 g of zinc stearate, 12 g of a commercial silicone oil and 840 g of water were introduced into a steel ball mill having a capacity of 6,000 parts by volume and containing 8,000 g of balls, and the mixture was dispersed for 24 hours. 750 g of a 40% strength polyurethane ionomer dispersion based on a hydroxyl-containing polyester, 4,4′-diphenylmethane diisocyanate, butane-1,4-diol, Epikote ®-diacrylate, mercaptoacetic acid and triethylamine were then incorporated into this mixture. Magnetic tapes were produced with the magnetic dispersion as described in Example 3. The results are shown in Table 2.

®=Registered Trademark of Deutsche Shell AG.

COMPARATIVE EXPERIMENT 3

The procedure described in Example 5 was followed, except that the dispersant described in Example 1 was replaced by 80 g of a 30% strength of an ammonium polyacrylate. However, the mixture had to be dispersed for 72 hours. The results are shown in Table 2.

TABLE 2

|  | Example 5 | Comparative Experiment 3 |
|---|---|---|
| Dispersing time | 24 | 72 |
| Average peak-to-valley height $R_z$, non-calendered ($\mu$m) | 0.54 | 1.21 |
| Average peak-to-valley height $R_z$, calendered ($\mu$m) | 0.29 | 0.47 |
| Reflectance, non-calendered | 48 | 29 |
| Sensitivity at long wavelengths $S_L$ (dB) 315 Hz | +0.1 | 0 |
| Sensitivity at short wavelengths $S_S$ (dB) 10 kHz | +1.3 | −3.5 |
| Maximum output level at long (dB) wavelengths $O_L$ 315 Hz | +0.2 | −0.1 |
| Maximum output level at short (dB) wavelengths $O_S$ 10 kHz | +0.5 | −3.5 |
| Thickness of magnetic layer | 4.5 | 4.7 |

We claim:

1. A process for the production of a magnetic recording medium by dispersing finely divided anisotropic magnetic material and conventional additives in a solution of a polymeric binder in an organic solvent or an aqueous dispersion of a polymeric binder, applying the dispersion, in the form of a layer, to a non-magnetizable base, orienting the anisotropic magnetic material by means of a magnetic field and then drying the applied layer, wherein the dispersant in an amount of from 0.5 to 5% by weight based on the amount of magnetic material added is a copolymer which contains, as characteristic monomers, (a) from 80 to 2% by weight of an ethylenically unsaturated $C_3$–$C_5$-carboxylic acid, acrylamidodimethyl-propanesulfonic acid, vinylsulfonic acid, vinylphosphoric acid or a mixture of the said monomers, and (b) from 20 to 98% by weight of a polymerizable ethylenically unsaturated compound of the formula

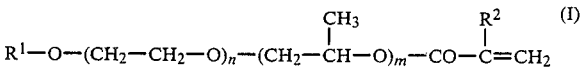

$$R^1-O-(CH_2-CH_2-O)_n-(CH_2-CH-O)_m-CO-C=CH_2 \quad (I)$$

wherein $R^1$ is alkyl of 1 to 20 carbon atoms or unsubstituted or $C_1$-$C_{12}$-alkyl-substituted phenyl, $R^2$ is H or -$CH_3$, n is 2 to 100 and m is 0 to 50.

2. The process for the production of a magnetic recording medium according to claim 1, wherein the copolymer additionally contains, as copolymerized units, (c) not more than 50% by weight of one or more other ethylenically unsaturated monomers which are copolymerizable with (a) and (b).

3. The process according to claim 2 wherein the dispersant is added in an amount of from 1 to 3% by weight based on the amount of magnetic material.

4. The process according to claim 1 wherein the dispersant is added in an amount of from 1 to 3% by weight based on the amount of magnetic material.

* * * * *